(12) United States Patent
Peng et al.

(10) Patent No.: US 11,944,995 B2
(45) Date of Patent: Apr. 2, 2024

(54) COATING SYSTEM

(71) Applicant: CONTEMPORARY AMPEREX TECHNOLOGY CO., LIMITED, Ningde (CN)

(72) Inventors: Angong Peng, Ningde (CN); Zhenguang Tang, Ningde (CN); Hongwu Shang, Ningde (CN); Pengjun Yang, Ningde (CN); Yinxiang Lin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/461,471

(22) Filed: Sep. 5, 2023

(65) Prior Publication Data

US 2023/0405628 A1    Dec. 21, 2023

Related U.S. Application Data

(63) Continuation of application No. 18/454,821, filed on Aug. 24, 2023, now abandoned, which is a
(Continued)

(30) Foreign Application Priority Data

May 5, 2022 (CN) .......................... 202221045996.4

(51) Int. Cl.
    *B05C 1/08* (2006.01)
(52) U.S. Cl.
    CPC ............ *B05C 1/0808* (2013.01); *B05C 1/083* (2013.01); *B05C 1/0839* (2013.01)

(58) Field of Classification Search
    None
    See application file for complete search history.

(56) References Cited

U.S. PATENT DOCUMENTS

| 4,704,296 A | * | 11/1987 | Leanna | ...................... B41F 9/02 427/9 |
| 4,791,881 A | * | 12/1988 | Iwasaki | ................... B41F 9/003 118/235 |

(Continued)

FOREIGN PATENT DOCUMENTS

| CN | 109317380 A | 2/2019 |
| CN | 211404608 U | 9/2020 |

(Continued)

*Primary Examiner* — Jethro M. Pence
(74) *Attorney, Agent, or Firm* — Kilpatrick Townsend & Stockton LLP

(57) ABSTRACT

Embodiments relate to a coating system. A substrate includes a first coating region and a second coating region adjacent to the first coating region. The coating system includes a first gravure mechanism and a second gravure mechanism, where the first gravure mechanism is configured to apply a first functional layer onto the first coating region, and the second gravure mechanism can receive the substrate having the first functional layer and apply a second functional layer made of a material different from that of the first functional layer onto the second coating region. In the coating system, with provision of first gravure mechanism and the second gravure mechanism, when the substrate is continuously transported in a same direction, the two functional layers made of different materials can be sequentially applied onto corresponding regions of the substrate.

18 Claims, 4 Drawing Sheets

Related U.S. Application Data continuation of application No. PCT/CN2023/078712, filed on Feb. 28, 2023.

(56) References Cited

U.S. PATENT DOCUMENTS

| | | | | |
|---|---|---|---|---|
| 4,948,635 A * | 8/1990 | Iwasaki | ............... | B41F 9/003 |
| | | | | 118/235 |
| 5,401,540 A * | 3/1995 | Miles | ............... | B05C 1/083 |
| | | | | 427/256 |
| 5,633,045 A * | 5/1997 | Smith | ............... | B05C 1/0813 |
| | | | | 118/244 |
| 6,033,723 A * | 3/2000 | Kistler | ............... | B05C 1/083 |
| | | | | 118/261 |
| 6,063,192 A | 5/2000 | Gottwald et al. | | |
| 6,093,248 A * | 7/2000 | Kohl | ............... | B05C 5/008 |
| | | | | 427/209 |
| 6,416,580 B1 * | 7/2002 | Kohl | ............... | B05C 11/025 |
| | | | | 118/419 |
| 6,709,515 B2 * | 3/2004 | Kodou | ............... | B05C 1/0808 |
| | | | | 118/259 |
| 7,449,216 B2 * | 11/2008 | Lobo | ............... | B05C 1/165 |
| | | | | 427/256 |
| 7,891,313 B2 * | 2/2011 | Wakai | ............... | H01M 4/0404 |
| | | | | 118/204 |
| 8,651,044 B2 * | 2/2014 | Ichimura | ............... | B05C 1/0813 |
| | | | | 118/200 |
| 8,739,728 B2 * | 6/2014 | Rebstock | ............... | B05C 1/0808 |
| | | | | 118/200 |
| 8,839,737 B2 * | 9/2014 | Weber | ............... | B41F 19/001 |
| | | | | 118/223 |
| 8,869,740 B2 * | 10/2014 | Moren | ............... | B24D 3/34 |
| | | | | 118/621 |
| 8,899,176 B2 * | 12/2014 | Sakaue | ............... | B05D 5/10 |
| | | | | 427/207.1 |
| 8,985,050 B2 * | 3/2015 | Von Gutfeld | ............ | B05D 3/06 |
| | | | | 205/205 |
| 9,088,043 B2 * | 7/2015 | Moon | ............... | B05C 1/0826 |
| 9,132,618 B2 * | 9/2015 | Crum | ............... | B41F 19/004 |
| 9,409,199 B2 * | 8/2016 | Nakano | ............... | B05B 12/084 |
| 9,486,828 B2 * | 11/2016 | Miura | ............... | B05C 5/005 |
| 9,636,700 B2 * | 5/2017 | Nitschke | ............... | B05C 11/00 |
| 9,987,654 B2 * | 6/2018 | Murata | ............... | B05C 3/02 |
| 10,246,286 B2 * | 4/2019 | Erkelenz | ............... | D21H 23/70 |
| 10,403,873 B2 * | 9/2019 | Watanabe | ............... | B05C 1/0808 |
| 10,525,498 B2 * | 1/2020 | Jung | ............... | B05C 5/0254 |
| 10,738,401 B2 * | 8/2020 | Sick | ............... | D06N 7/0073 |
| 10,760,274 B2 * | 9/2020 | Fornasier | ............... | B05C 19/04 |
| 10,800,186 B2 * | 10/2020 | Pervan | ............... | C09D 197/02 |
| 10,960,442 B2 * | 3/2021 | Hamilton | ............... | B41F 35/00 |
| 11,384,419 B2 * | 7/2022 | Frey | ............... | B05C 1/0826 |
| 11,400,479 B1 * | 8/2022 | Ellis | ............... | B05C 11/1005 |
| 11,495,781 B2 * | 11/2022 | Min | ............... | B05C 1/16 |
| 11,597,988 B2 * | 3/2023 | Frey | ............... | B05C 1/08 |
| 11,597,989 B2 * | 3/2023 | Frey | ............... | H01M 4/0485 |
| 2005/0163934 A1 * | 7/2005 | Ruschak | ............... | B05C 1/0813 |
| | | | | 427/420 |
| 2005/0241573 A1 * | 11/2005 | Ogawa | ............... | B41F 9/063 |
| | | | | 118/204 |
| 2011/0189378 A1 * | 8/2011 | Moon | ............... | H01M 10/0431 |
| | | | | 427/9 |
| 2012/0183681 A1 * | 7/2012 | Umebara | ............... | B05C 1/0808 |
| | | | | 118/200 |
| 2012/0301605 A1 * | 11/2012 | Kim | ............... | B05C 1/0808 |
| | | | | 118/200 |
| 2014/0090593 A1 * | 4/2014 | Umebara | ............... | B05C 1/0817 |
| | | | | 118/255 |
| 2017/0095830 A1 * | 4/2017 | Shiba | ............... | B05D 1/28 |
| 2023/0030511 A1 * | 2/2023 | Min | ............... | B05C 1/083 |
| 2023/0149971 A1 * | 5/2023 | Seo | ............... | B05C 1/0895 |
| | | | | 118/712 |

FOREIGN PATENT DOCUMENTS

| | | |
|---|---|---|
| CN | 217774594 U | 11/2022 |
| JP | 2015036140 A | 2/2015 |
| JP | 2019076824 A | 5/2019 |

\* cited by examiner

COATING SYSTEM

CROSS-REFERENCE TO RELATED APPLICATIONS

This application is a continuation of U.S. application Ser. No. 18/454,821, filed Aug. 24, 2023, which is a continuation of International Application PCT/CN2023/078712, filed Feb. 28, 2023, which claims priority to Chinese Patent Application No. 202221045996.4 filed on May 5, 2022 and entitled "COATING SYSTEM", which is incorporated herein by reference in its entirety.

TECHNICAL FIELD

This application relates to the field of traction battery technologies, and more specifically, to a coating system.

BACKGROUND

During preparation of an electrode plate, a primer coating is typically first applied onto a substrate, and then after the primer coating is dried, an active material layer and an insulation glue layer are simultaneously applied. During coating, slurries of the active material layer and the insulation glue layer are apt to be mixed together, resulting in an excessively thin edge or an excessively thick edge of the active material layer, thus impacting service life and safety of the battery and leading to a high scrap rate and defect rate of the substrate.

SUMMARY

In view of this, this application provides a coating system.

A coating system for coating a substrate, where the substrate includes a first coating region and a second coating region adjacent to the first coating region, and the coating system includes a first gravure mechanism and a second gravure mechanism, where the first gravure mechanism is configured to apply a first functional layer onto the first coating region, and the second gravure mechanism is able to receive the substrate having the first functional layer and apply a second functional layer made of a material different from that of the first functional layer onto the second coating region. In the coating system, with provision of first gravure mechanism and the second gravure mechanism, when the substrate is continuously transported in a same direction, the two functional layers made of different materials can be sequentially applied onto corresponding regions of the substrate, and then an active material layer is applied, facilitating improving continuity and efficiency of coating and decreasing a scrap rate and defect rate of the substrate.

In an embodiment, the first gravure mechanism includes a first gravure roller and a first liquid storage tank loading the first functional layer, where the first gravure roller is rotatable relative to the first liquid storage tank and is partly located in the first liquid storage tank, and surface of the substrate is tangent to that of the first gravure roller, where the first gravure roller is rotated to pick up and apply the first functional layer. In this way, as the first gravure roller rotates, the first gravure roller can pick up the first functional layer that is in the first liquid storage tank and print and apply it onto the first coating region.

In one embodiment, the first gravure roller includes a first roller body, where surface of the first roller body is provided with a first engraving region having a plurality of first reticulate patterns, width of the first engraving region being equal to that of the first coating region. In this way, when the first roller body rotates, slurry in the first liquid storage tank can be attached into the first reticulate pattern, facilitating application of the slurry.

In one embodiment, the second coating region is disposed at an edge of an outer periphery of the first coating region, where the substrate further includes a blank region located at a side of the second coating region facing away from the first coating region, the surface of the first roller body is provided with a first blank-leaving region adjacent to the first engraving region, and the first blank-leaving region has a smooth surface, width of the first blank-leaving region being greater than that of the blank region. In this way, the first blank-leaving region of the first roller body can be in one-to-one correspondence with the blank region of the substrate to meet requirements of coating.

In one embodiment, the first engraving region is provided in a quantity of at least two, and one first blank-leaving region is disposed between every two adjacent first engraving regions. In this way, efficiency of coating and efficiency of subsequent processing can be effectively improved.

In one embodiment, the first gravure mechanism further includes a scraper, where a blade of the scraper is tangent to surfaces of the first engraving region and the first blank-leaving region. In this way, when the first roller body rotates, the slurries attached to the first engraving region and the first blank-leaving region are treated by the scraper, making thickness and uniformity of the slurry meet requirements.

In one embodiment, the second gravure mechanism is located in a transporting direction of the substrate downstream from the first gravure mechanism, and the second gravure mechanism includes a second gravure roller and a second liquid storage tank loading the second functional layer, where the second gravure roller is rotatable relative to the second liquid storage tank and is partly located in the second liquid storage tank, and the surface of the substrate is tangent to that of the second gravure roller, where the second gravure roller is rotated to pick up and apply the second functional layer. In this way, as the second gravure roller rotates, the second gravure roller can pick up the second functional layer that is in the second liquid storage tank and print and apply it onto the second coating region.

In one embodiment, the second gravure roller includes a second roller body, where surface of the second roller body is provided with a second engraving region and a second blank-leaving region, width of the second engraving region being equal to that of the second coating region and a sum of the widths of the second blank-leaving region and the second engraving region being equal to the width of the blank region; and surface of the second engraving region is provided with a plurality of second reticulate patterns, and the second blank-leaving region has a smooth surface. In this way, when the second roller body rotates, a slurry in the second liquid storage tank can be attached into the second reticulate pattern, facilitating application of the slurry.

In one embodiment, the second roller body further includes an escape groove, where the escape groove runs through a circumferential side of the second roller body to communicate with outside, width of the escape groove being equal to that of the first coating region. In this way, it can be effectively ensured that the second functional layer is not applied onto the first coating region, preventing the two functional layers from being mixed during application.

In one embodiment, one second blank-leaving region is disposed between every two adjacent escape grooves, and edges of two ends of each of the escape grooves are both provided with one second engraving region. In this way, efficiency of coating can be effectively improved.

In one embodiment, the coating system further includes a second through roller, where the second through roller is disposed between the second gravure roller and the first gravure roller. In this way, a tension force can be provided for the substrate located between the second gravure roller and the first gravure roller, preventing the substrate from collapsing during transportation and impacting coating effect.

In one embodiment, the coating system further includes a pressing roller and a winding roller for placing the substrate, where the winding roller is located in the transporting direction of the substrate upstream from the first gravure roller and is higher than the first gravure roller in a vertical direction, and the pressing roller and the first gravure roller are disposed adjacent to each other and are able to simultaneously rotate in different directions to transport the substrate. In this way, actions of the first gravure roller and the pressing roller fully reduce contact between the slurry applied onto the first coating region and air and make the first gravure roller and the slurry in the first liquid storage tank fully contact with each other, guaranteeing quality of gravure printing.

In one embodiment, the coating system further includes a first through roller, where the first through roller is disposed between the winding roller and the pressing roller. In this way, the first through roller can provide a tension force for the substrate located between the winding roller and pressing roller, preventing the substrate from collapsing during transportation and impacting coating effect.

In one embodiment, the first functional layer is a primer slurry, and the second functional layer is an insulation glue or insulation coating. In this way, the first functional layer and the second functional layer made of different materials are applied onto different regions before the active material layer is applied, which can effectively prevent the active material layer and the insulation slurry from being mixed, thereby avoiding an excessively thin edge or excessively thick edge of the active material layer.

Figure 1:
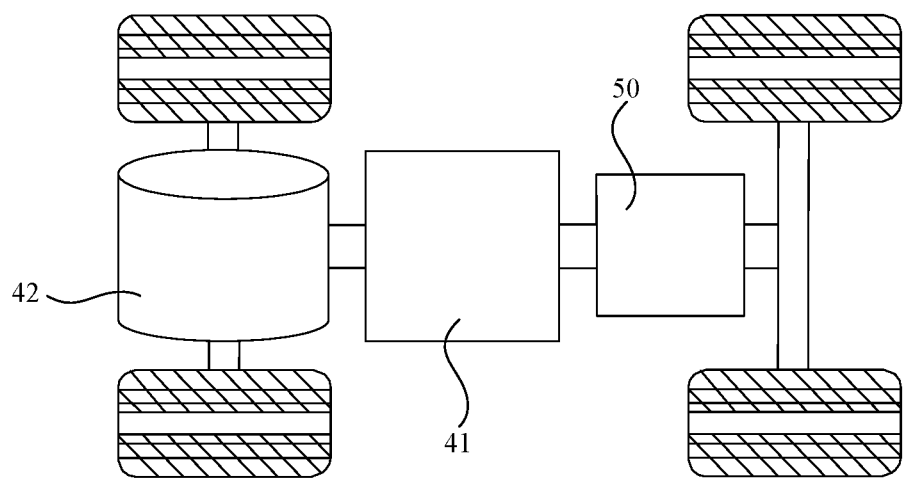
FIG. 1 is a schematic diagram of an electric device according to an embodiment.

REFERENCE SIGNS 10. substrate; 11. first coating region; 12. blank region; 13. second coating region; 20. first functional layer; 30. second functional layer; 40. vehicle; 41. controller; 42. motor; 50. battery; 100. first gravure mechanism; 110. pressing roller; 120. first gravure roller; 121. first roller body; 122. first engraving region; 1221. first reticulate pattern; 123. first blank-leaving region; 130. first liquid storage tank; 140. scraper; 200. second gravure mechanism; 210. second gravure roller; 211. second roller body; 212. second engraving region; 2121. second reticulate pattern; 213. second blank-leaving region; 214. escape groove; 220. second liquid storage tank; 300. first through roller; 400. second through roller; and X. width direction.

DESCRIPTION OF EMBODIMENTS

To make the foregoing objectives, features, and advantages of this application clearer and more understandable, the following describes in detail the embodiments of this application with reference to the accompanying drawings. The following illustrates many specific details for full understanding of this application. However, this application can be implemented in many other manners different from the manners described herein. Persons skilled in the art may make similar improvements without departing from the connotation of this application, and therefore, this application is not limited by the specific embodiments disclosed below.

In the description of this application, it should be understood that the orientations or positional relationships indicated by the terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of this application rather than indicating or implying that the apparatuses or components mentioned must have specific orientations or must be constructed or manipulated according to specific orientations, and therefore shall not be construed as any limitations on this application.

In addition, the terms "first" and "second" are merely for the purpose of description, and shall not be understood as any indication or implication of relative importance or any implicit indication of the number of technical features indicated. Thus, the features defined with "first" and "second" may explicitly or implicitly include at least one of the features. In the description of this application, "a plurality of" means at least two, for example, two or three, unless otherwise specifically defined.

In this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, may refer to a direct connection, an indirect connection via an intermediate medium, or may be intercommunication between two components or an interaction between two elements unless otherwise specifically defined. Persons of ordinary skill in the art can understand specific meanings of these terms in this application as appropriate to specific situations.

In this application, unless otherwise specified and defined explicitly, the first feature being at the "upper" or "lower" side of the second feature means that the first feature may be in direct contact with the second feature, or the first feature and the second feature are in indirect contact with each other by means of the intermediate medium. Moreover, that the first feature is "on", "above", or "on top of" the second feature includes that the first feature is directly and obliquely above the second feature, or only indicates that the level of the first feature is higher than the level of the second feature. That the first feature is "under", "below", or "beneath" the second feature includes that the first feature is directly and obliquely below the second feature, or only indicates that the level of the first feature is lower than the level of the second feature.

It should be noted that when an element is referred to as being "fixed to" or "disposed on" another element, it may be directly fixed to another element, or there may be a component in between. When an element is deemed as being "connected to" another element, it may be directly connected to another element. or there may be a component in between. The terms "vertical", "horizontal", "upper", "lower", "left", "right", and similar expressions used in this specification are merely for illustrative purposes and do not represent the unique possible implementation.

At present, lithium-ion batteries as environmentally friendly batteries have been widely applied in electronic devices such as smart phones and digital cameras and electric vehicles due to their advantages of high energy density, high working voltages, high safety performance, and long service life. With increasing demand for storage and use of green energy and environmentally friendly energy, lithium-ion batteries have become a bottleneck to solve development challenges of new energy.

Lithium-ion batteries include a variety of types, and wound lithium-ion batteries have been used widely. The wound lithium-ion battery includes a housing, a battery cell, and an electrolyte, where the electrolyte is injected into the housing, and the battery cell is accommodated inside the housing having the electrolyte. The battery cell includes a positive electrode plate, a separator, and a negative electrode plate that are stacked. The positive electrode plate and the negative electrode plate are typically prepared first, and then the positive electrode plate, the separator, and the negative electrode plate are wound and assembled into a battery cell, followed by processes such as hot or cold pressing, formation, shaping, and capacity testing, to produce a finished product of a lithium-ion battery.

During preparation of an electrode plate, a primer coating is typically first applied onto a substrate, and then after the primer coating is dried, an active material layer and an insulation glue layer are simultaneously applied. During coating, slurries of the active material layer and the insulation glue layer are apt to be mixed together, resulting in an excessively thin edge or an excessively thick edge of the active material layer, thus impacting service life and safety of the battery and leading to a high scrap rate and defect rate of the substrate.

Based on the above considerations, to resolve the problem of a high scrap rate and defect rate of the substrate, a coating system has been designed through in-depth research, where a first functional layer and a second functional layer that are made of different materials are applied onto different regions, and then an active material layer is applied, so as to decrease the scrap rate and defect rate of the substrate.

It should be noted that the battery mentioned in this application is a single physical module that includes one or more battery cells for providing a higher voltage and capacity. For example, the battery mentioned in this application may include a battery pack.

To meet different power requirements, the battery may include a plurality of battery cells, and the plurality of battery cells may be connected in series, parallel, or series-parallel, where being connected in series-parallel means a combination of series and parallel connections. Optionally, a plurality of battery cells may be connected in series, parallel, or series-parallel to form a battery module first, and then a plurality of battery modules are connected in series, parallel, or series-parallel to form a battery. In a word, the plurality of battery cells may be directly combined into a battery, or may first be combined into battery modules which are then combined into a battery. The battery is then disposed in an electric device to provide electrical energy for the electric device.

In this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. The battery cell may be cylindrical, flat, cuboid, or of other shapes, which is not limited in the embodiments of this application either. Battery cells are typically divided into three types by packaging method: cylindrical cell, prismatic cell, and pouch cell. The type of battery is not limited in the embodiments of this application either.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on the surface of the positive electrode current collector. The part of current collector uncoated with the positive electrode active substance layer protrudes out of the part of current collector coated with the positive electrode active substance layer and serves as a positive tab. A lithium-ion battery is used as an example, for which, the positive electrode current collector may be made of aluminum, and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is applied on the surface of the negative electrode current collector. The part of current collector uncoated with the negative electrode active substance layer protrudes out of the part of current collector coated with the negative electrode active substance layer and serves as a negative tab. The negative electrode current collector may be made of copper, and the negative electrode active substance may be carbon, silicon, or the like. To ensure a large current to pass through without any fusing, multiple positive tabs are provided and stacked together, and multiple negative tabs are also provided and stacked together. The separator may be made of polypropylene (PP), polyethylene (PE), or the like. In addition, the electrode assembly may be a winding structure or a stacking structure, but the embodiments of this application are not limited thereto.

An electric device that uses a battery as a power source is provided in this application. The electric device may be, but is not limited to, a mobile phone, a tablet, a laptop computer, an electric toy, an electric tool, an electric bicycle, an electric car, a ship, or a spacecraft. The electric toy may be a fixed or mobile electric toy, for example, a game console, an electric toy car, an electric toy ship, and an electric toy airplane. The spacecraft may include an airplane, a rocket, a space shuttle, a spaceship, and the like.

For ease of description, the electric device of an embodiment of this application being a vehicle 40 is used as an example for description of the following embodiments.

Referring to FIG. 1, FIG. 1 is a schematic structural diagram of a vehicle according to some embodiments of this application. The vehicle 40 may be a fossil fuel vehicle, a natural-gas vehicle, or a new energy vehicle, where the new energy vehicle may be a battery electric vehicle, a hybrid electric vehicle, a range-extended vehicle, or the like. The vehicle 40 is provided with a battery 50 inside, where the battery 50 may be disposed at the bottom, front, or rear of the vehicle 40. The battery may be configured to supply power to the vehicle 40. For example, the battery 50 may be used as an operational power source for the vehicle 40. The vehicle 40 may further include a controller 41 and a motor 42, where the controller 41 is configured to control the battery 50 to supply power to the motor 42, for example, to satisfy power needs of start, navigation, and driving of the vehicle 40.

In some embodiments of this application, the battery 50 can be used as not only the operational power source for the vehicle 40 but also a driving power source for the vehicle 40, replacing or partially replacing fossil fuel or natural gas to provide driving traction for the vehicle 40.

Figure 2:
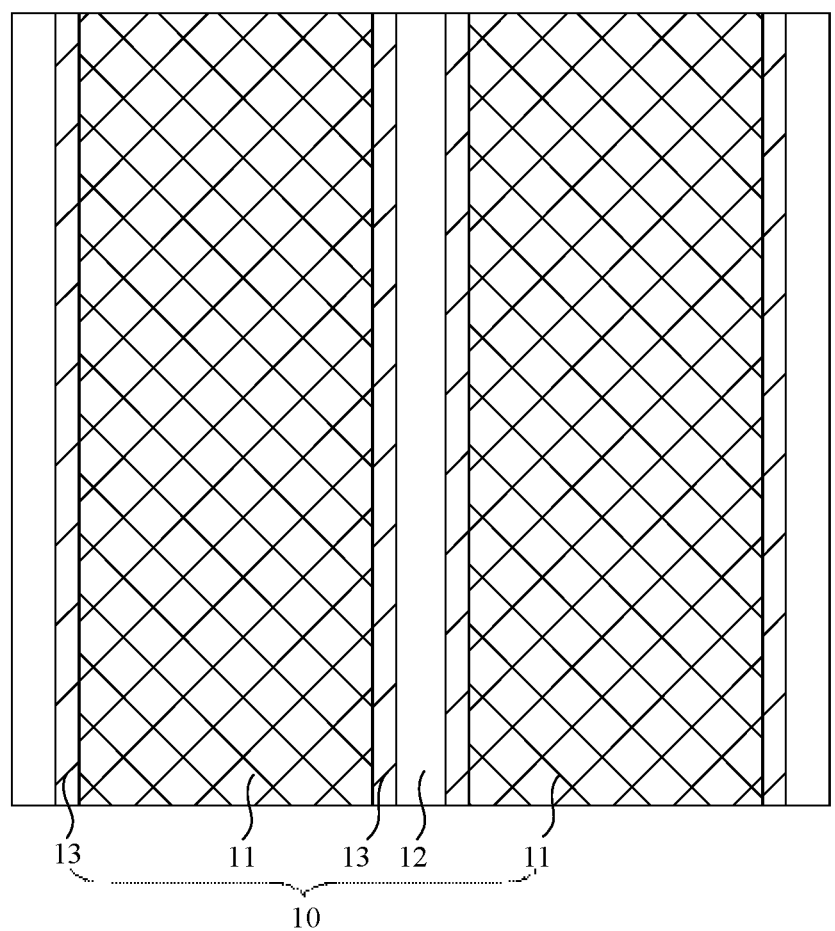
FIG. 2 is a schematic diagram of a substrate according to an embodiment.

According to some embodiments of this application, FIG. 2 is a schematic structural diagram of a substrate 10 in this application. Referring to FIG. 2, the coating system in an embodiment is used for coating the substrate 10, where the substrate 10 includes a first coating region 11 and a second coating region 13 adjacent to the first coating region 11.

Figure 3:
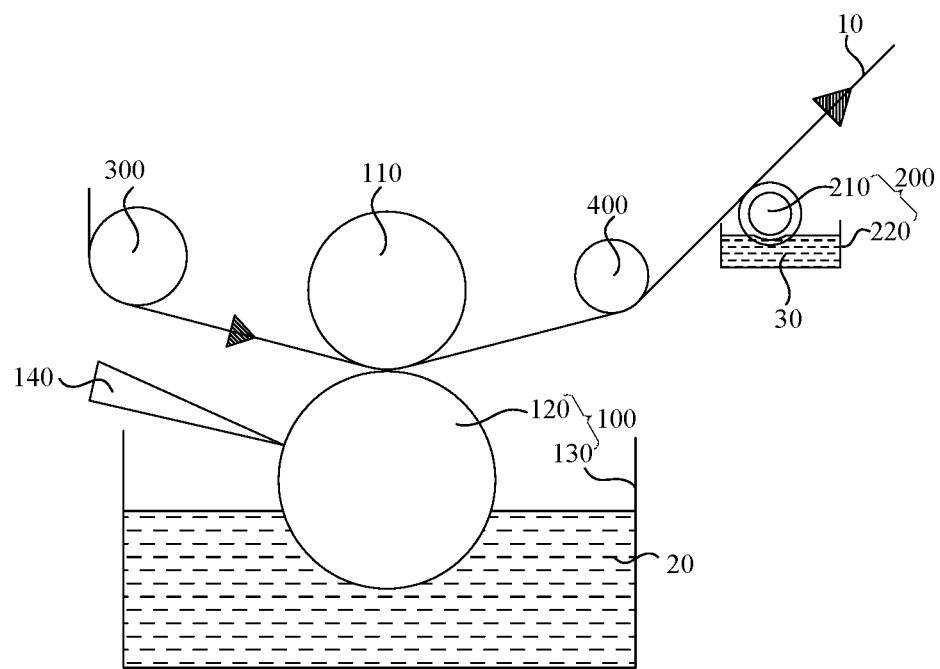
FIG. 3 is a schematic diagram of a coating system according to an embodiment.

With reference to FIG. 3, the coating system includes a first gravure mechanism 100 and a second gravure mechanism 200. The first gravure mechanism 100 is configured to apply a first functional layer 20 onto the first coating region 11, and the second gravure mechanism 200 receives the substrate 10 having the first functional layer 20 and applies a second functional layer 30 made of a material different from that of the first functional layer 20 onto the second coating region 13.

In the coating system, with provision of first gravure mechanism 100 and the second gravure mechanism 200, when the substrate 10 is continuously transported in a same direction, the two functional layers made of different materials can be sequentially applied onto corresponding regions of the substrate 10, and then an active material layer is applied, facilitating improving continuity and efficiency of coating and decreasing the scrap rate and defect rate of the substrate 10.

It should be noted that the substrate 10 has two surfaces disposed opposite each other, where each surface has the first coating region 11 and the second coating region 13. When the first functional layer 20 and the second functional layer 30 have been applied onto one of the surfaces, the first functional layer 20 and the second functional layer 30 are then applied onto the other surface, and finally the active material layers are respectively applied onto the first coating regions 11 of both surfaces.

Specifically, the first coating region 11 is a region that is divided from the surface of the substrate 10 and used for bearing the first functional layer 20 and the active material layer, where in the first coating region 11, the first functional layer 20 is applied onto the surface of the substrate 10, and the active material layer is applied onto the surface of the first functional layer 20.

Specifically, the second coating region 13 is a region that is divided from the surface of the substrate 10 and used for bearing the second functional layer 30.

Specifically, the functional layer is a functional slurry that is applied onto the surface of the substrate 10 and has different functions on the surface of the substrate 10 based on different types of the slurry. For example, the functional layer may be a primer slurry or an insulation slurry or another functional slurry.

According to some embodiments of this application, the first functional layer 20 is a primer slurry, and the second functional layer 30 is an insulation glue or insulation coating. In this way, the first functional layer 20 and the second functional layer 30 made of different materials are applied onto different regions before the active material layer is applied, which can effectively prevent the active material layer and the insulation slurry from being mixed, thereby avoiding an excessively thin edge or excessively thick edge of the active material layer.

Specifically, the substrate 10 is a member or a part that is configured to bear the functional layer or active material layer, and collect and output current produced by the active material. The substrate 10 may be copper foil or aluminum foil. However, aluminum foil having a low dyne value makes its surface onto which an aqueous slurry is applied have a large surface tension and a poor levelling property. Therefore, in this embodiment, the copper foil can be preferably selected as the substrate 10.

Specifically, the primer slurry includes a functional material, a binder, and a conductive agent, where the binder may be selected from at least one of polyvinylidene fluoride, a vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene, polyhexafluoropropylene, and styrene-butadiene rubber; and the conductive agent may be selected from at least one of carbon black, carbon fiber, carbon nanotubes, graphite, graphene, metal powder, a composite conductive material, and conductive ceramic powder.

Specifically, the insulation glue is at least one of oil-based epoxy resin, bismaleimide resin, water-based polyvinylidene fluoride, and polyimide. The insulation coating is a metal oxide particle coating. A material of the insulation coating specifically includes metal oxide particles, polyvinylidene fluoride, and N-methylpyrrolidone, where a material of the metal oxide particle may be selected from aluminum oxide, titanium dioxide, zinc oxide, magnesium oxide, and a combination thereof.

Specifically, the active material layer includes at least one of lithium nickel cobalt manganate, lithium iron phosphate, lithium nickelate, lithium nickel manganate, and lithium ferromanganese nickel. The active substance is divided into a positive electrode active substance and a negative electrode active substance. That is, the positive electrode active substance is used in an active substance slurry of a positive electrode plate, and a negative electrode active substance is used in an active substance slurry of a negative electrode plate.

In this embodiment, the second gravure mechanism 200 is located in a transporting direction of the substrate 10 downstream from the first gravure mechanism 100. The first gravure mechanism 100 and the second gravure mechanism 200 are sequentially provided in the transporting direction of the substrate 10, so that when the substrate 10 is continuously transported in a same direction, two functional layers made of different materials can be sequentially applied onto corresponding regions of the substrate 10. That the second gravure mechanism 200 is located in the transporting direction of the substrate 10 downstream from the first gravure mechanism 100 specifically means that when the substrate 10 is continuously transported in the same direction, the substrate 10 sequentially goes through the first gravure mechanism 100 and the second gravure mechanism 200.

According to some embodiments of this application, referring to FIG. 3, the first gravure mechanism 100 includes a first gravure roller 120 and a first liquid storage tank 130 loading the first functional layer 20, where the first gravure roller 120 is rotatable relative to the first liquid storage tank 130 and is partly located in the first liquid storage tank 130, and surface of the substrate 10 is tangent to that of the first gravure roller 120, where the first gravure roller 120 is rotated to pick up and apply the first functional layer 20. In this way, when the first gravure roller 120 rotates, the first gravure roller 120 can pick up the first functional layer 20 that is in the first liquid storage tank 130 and print and apply it onto the first coating region 11.

The inner diameter of the first liquid storage tank 130 is greater than or equal to the diameter of the first gravure roller 120. The first gravure roller 120 is partly located in the first liquid storage tank 130 and should satisfy that when the first functional layer 20 is loaded inside the first liquid storage tank 130, the first gravure roller 120 is partly soaked in the first functional layer 20 such that the first gravure roller 120 can rotate to pick up the first functional layer 20.

In this embodiment, the first gravure roller 120 is located in the middle of the first liquid storage tank 130 to help the first gravure roller 120 rotate and uniformly pick up the first functional layer 20. In other embodiments, the first gravure roller 120 may alternatively be located closer to the left side or right side of the first liquid storage tank 130.

According to some embodiments of this application, referring to FIG. 3, the coating system further includes a pressing roller 110 and a winding roller for placing the substrate 10, where the winding roller is located in the transporting direction of the substrate 10 upstream from the first gravure roller 120 and is higher than the first gravure roller 120 in a vertical direction, and the pressing roller 110 and the first gravure roller 120 are disposed adjacent to each other and can simultaneously rotate in different directions to transport the substrate 10.

In this way, actions of the first gravure roller 120 and the pressing roller 110 fully reduce contact between the slurry applied onto the first coating region 11 and air and make the first gravure roller 120 and the slurry in the first liquid storage tank 130 fully contact with each other, guaranteeing quality of gravure printing.

For example, when the substrate 10 is continuously transported to the right in a direction indicated by the arrow in FIG. 3, the first gravure roller 120 rotates clockwise, and the pressing roller 110 simultaneously rotates counterclockwise, so that the first functional layer 20 can be printed and applied onto the first coating region 11 through the first gravure roller 120, and the substrate 10 having the first functional layer 20 can be continuously transported to the right.

According to some embodiments of this application, referring to FIG. 3, the coating system further includes a first through roller 300, where the first through roller 300 is disposed between the winding roller and the pressing roller 110. In this way, the first through roller 300 can provide a tension force for the substrate 10 located between the winding roller and pressing roller 110, preventing the substrate 10 from collapsing during transportation and impacting coating effect.

Specifically, the first through roller 300 has a smooth surface.

Figure 4:
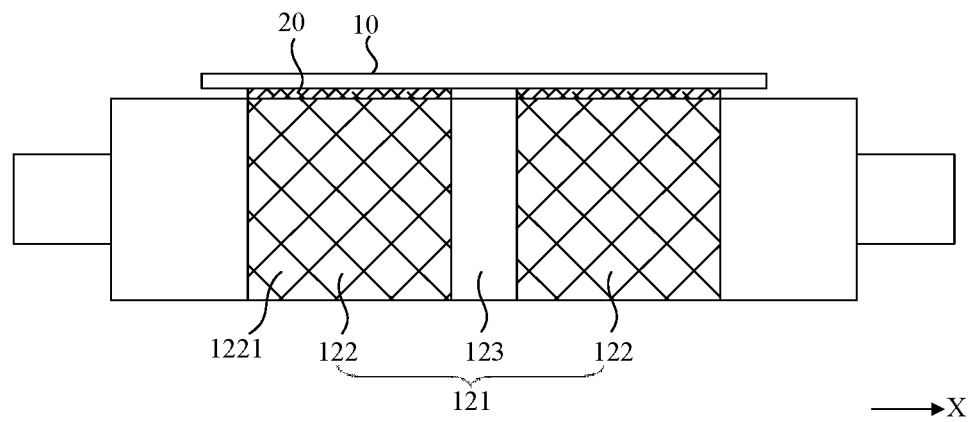
FIG. 4 is a schematic diagram of a first gravure roller in the coating system shown in FIG. 3.

According to some embodiments of this application, referring to FIG. 4, the first gravure roller 120 includes a first roller body 121, where surface of the first roller body 121 is provided with a first engraving region 122 whose surface is provided with a plurality of first reticulate patterns 1221, width of the first engraving region 122 being equal to that of the first coating region 11.

A width direction is the direction X shown in FIG. 3. With the above arrangement, when the first roller body 121 rotates, a slurry in the first liquid storage tank 130 can be attached into the first reticulate pattern 1221, facilitating application of the slurry.

In this embodiment, the first reticulate pattern 1221 is of a rhombic grid shape. In other embodiments, the first reticulate pattern 1221 may alternatively be of a circular pit shape, a rectangular grid shape, or other shapes.

According to some embodiments of this application, referring to FIG. 4, the second coating region 13 is disposed at an edge of an outer periphery of the first coating region 11. The substrate 10 further includes a blank region 12 located at a side of the second coating region 13 facing away from the first coating region 11. The surface of the first roller body 121 is provided with a first blank-leaving region 123 adjacent to the first engraving region 122, where the first blank-leaving region 123 has a smooth surface, width of the first blank-leaving region 123 being greater than that of the blank region 12.

It can be understood that, after the substrate 10 is coated with the functional layers and active layer, the provision of the blank region 12 can reserve operation space for subsequent processing procedures (for example, cutting the substrate 10). With the above arrangement, the first blank-leaving region 123 of the first roller body 121 can be in one-to-one correspondence with the blank region 12 of the substrate 10 to meet requirements of coating.

Specifically, the blank region 12 is a region that is divided from the surface of the substrate 10 and bears no slurry. The provision of the blank region 12 reserves operation space for subsequent processing procedures (for example, cutting the substrate 10).

Specifically, the first engraving region 122 is a region that is divided from the surface of the first roller body 121 and capable of carrying the first functional layer 20.

Specifically, the first blank-leaving region 123 is a region that is divided from the surface of the first roller body 121 and carries no first functional layer 20.

In this embodiment, referring to FIG. 4, the first engraving region 122 is provided in a quantity of at least two, and one first blank-leaving region 123 is disposed between every two adjacent first engraving regions 122. Correspondingly, the substrate 10 has at least two first coating regions 11, and one blank region 12 is disposed between every two adjacent first coating regions 11. With such arrangement, efficiency of coating and efficiency of subsequent processing can be effectively improved.

In other embodiments, the first engraving region 122 and the first blank-leaving region 123 may alternatively be provided in a quantity of one, which can be set based on actual needs.

According to some embodiments of this application, referring to FIG. 3, the first gravure mechanism 100 further includes a scraper 140, where a blade of the scraper 140 is tangent to the surfaces of the first engraving region 122 and the first blank-leaving region 123. In this way, when the first roller body 121 rotates, the slurries attached to the first engraving region 122 and the first blank-leaving region 123 are treated by the scraper 140, making thickness and uniformity of the slurry meet requirements.

According to some embodiments of this application, referring to FIG. 3, the second gravure mechanism 200 includes a second gravure roller 210 and a second liquid storage tank 220 loading the second functional layer 30, where the second gravure roller 210 can rotate relative to the second liquid storage tank 220 and is partly located in the second liquid storage tank 220, and the surface of the substrate 10 is tangent to that of the second gravure roller 210, where the second gravure roller 210 is rotated to pick up and apply the second functional layer 30. In this way, as the second gravure roller 210 rotates, the second gravure roller 210 can pick up the second functional layer 30 that is in the second liquid storage tank 220 and print and apply it onto the second coating region 13.

The inner diameter of the second liquid storage tank 220 is greater than or equal to the diameter of the second gravure roller 210. The second gravure roller 210 is partly located in the second liquid storage tank 220 and should satisfy that when the second functional layer 30 is loaded inside the second liquid storage tank 220, the second gravure roller 210 is partly soaked in the second functional layer 30 such that the second gravure roller 210 can rotate to pick up the second functional layer 30.

In this embodiment, the second gravure roller 210 is located in the middle of the second liquid storage tank 220 to help the second gravure roller 210 rotate and uniformly pick up the second functional layer 30. In other embodiments, the second gravure roller 210 may alternatively be located closer to the left side or right side of the second liquid storage tank 220.

Figure 5:
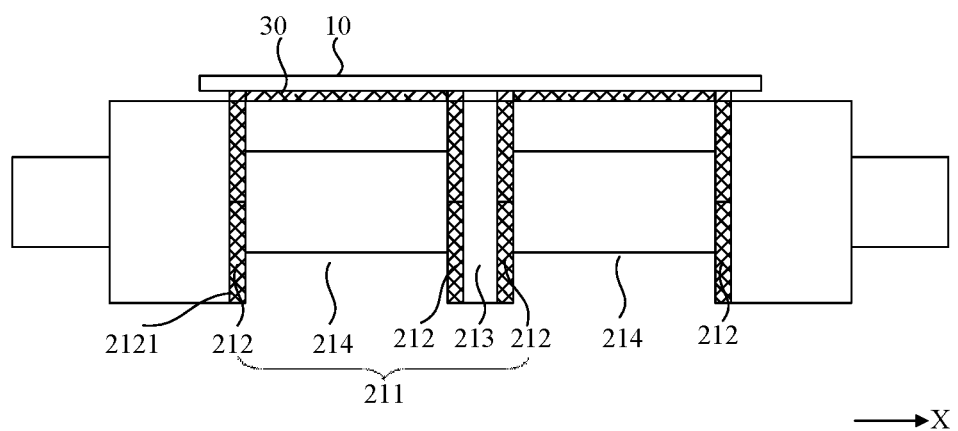
FIG. 5 is a schematic diagram of a second gravure roller in the coating system shown in FIG. 3.

According to some embodiments of this application, referring to FIG. 5, the second gravure roller 210 includes a second roller body 211, where surface of the second roller body 211 is provided with a second engraving region 212 and a second blank-leaving region 213, width of the second engraving region 212 being equal to that of the second coating region 13 and a sum of the widths of the second blank-leaving region 213 and the second engraving region 212 being equal to the width of the blank region 12; and surface of the second engraving region 212 is provided with a plurality of second reticulate patterns 2121, and the second blank-leaving region 213 has a smooth surface. In this way, when the second roller body 211 rotates, slurry in the second liquid storage tank 220 can be attached into the second reticulate pattern 2121, facilitating application of the slurry.

For example, when the first coating region 11 is provided in a quantity of at least two, the second coating region 13 is provided in a quantity of at least four, and edges of two sides of each of the coating regions are both provided with one second coating region 13. Correspondingly, the first engraving region 122 is provided in a quantity of at least two, and the second engraving region 212 is provided in a quantity of at least four, where one second blank-leaving region 213 is disposed between every two adjacent second engraving regions 212.

Specifically, the second engraving region 212 is a region divided from the surface of the second roller body 211 and capable of carrying the second functional layer 30.

Specifically, the second blank-leaving region 213 is a region divided from the surface of the second roller body 211 and carrying no second functional layer 30. In this embodiment, the second reticulate pattern 2121 is of a rhombic grid shape. In other embodiments, the second reticulate pattern 2121 may alternatively be of a circular pit shape, a rectangular grid shape, or other shapes.

According to some embodiments of this application, referring to FIG. 1, the second roller body 211 further includes an escape groove 214, where the escape groove 214 runs through a circumferential side of the second roller body 211 to communicate with outside, width of the escape groove 214 being equal to that of the first coating region 11. In this way, it can be effectively ensured that the second functional layer 30 is not applied onto the first coating region 11, preventing the two functional layers from being mixed during application.

In this embodiment, the escape groove 214 is provided in a quantity of at least two, where one second blank-leaving region 213 is disposed between every two adjacent escape grooves 214, and edges of two ends of each of the escape grooves 214 are both provided with one second engraving region 212. In this way, efficiency of coating can be effectively improved. In other embodiments, the escape groove 214 may alternatively be provided in a quantity of one, which can be designed based on actual needs.

According to some embodiments of this application, referring to FIG. 1, the coating system further includes a second through roller 400, where the second through roller 400 is disposed between the second gravure roller 210 and the first gravure roller 120. In this way, a tension force can be provided for the substrate 10 located between the second gravure roller 210 and the first gravure roller 120, preventing the substrate 10 from collapsing during transportation impacting coating effect.

Specifically, the second through roller 400 has a smooth surface.

According to some embodiments of this application, referring to FIG. 2, a coating system in one embodiment is used for coating the substrate 10, where the substrate 10 includes the first coating region 11, the second coating region 13 disposed at an edge of an outer periphery of the first coating region 11, and the blank region 12 located at a side of the second coating region 13 facing away from the first coating region 11. With reference to FIG. 3, the coating system includes the first gravure mechanism 100 and the second gravure mechanism 200, where the second gravure mechanism 200 is located in the transporting direction of the substrate 10 downstream from the first gravure mechanism 100, the first gravure mechanism 100 is configured to apply a first functional layer 20 onto the first coating region 11, and the second gravure mechanism 200 receives the substrate 10 having the first functional layer 20 and applies a second functional layer 30 made of a material different from that of the first functional layer 20 onto the second coating region 13.

The first gravure mechanism 100 includes the pressing roller 110, the winding roller for placing the substrate 10, the first gravure roller 120, the first liquid storage tank 130 loading the first functional layer 20, the scraper 140, and the first through roller 300. The first gravure roller 120 is rotatable relative to the first liquid storage tank 130 and is partly located in the first liquid storage tank 130, and the surface of the substrate 10 is tangent to that of the first gravure roller 120. The first gravure roller 120 includes the first roller body 121, where the surface of the first roller body 121 is provided with the first engraving region 122 and the first blank-leaving region 123 adjacent to the first engraving region 122. The surface of the first engraving region 122 is provided with a plurality of first reticulate pattern 1221, width of the first engraving region 122 being equal to that of the first coating region 11. The first blank-leaving region 123 has a smooth surface, width of the first blank-leaving region 123 being equal to that of the blank region 12. The blade of the scraper 140 is tangent to the surfaces of the first engraving region 122 and the first blank-leaving region 123. The winding roller is located in the transporting direction of the substrate 10 upstream from the first gravure roller 120 and is higher than the first gravure roller 120 in a vertical direction. The pressing roller 110 and the first gravure roller 120 are disposed adjacent to each other and can rotate simultaneously in different directions to transport the substrate 10. The first through roller 300 is disposed between the winding roller and the pressing roller 110.

The second gravure mechanism 200 includes the second gravure roller 210, the second liquid storage tank 220 loading the second functional layer 30, and the second through roller 400, where the second through roller 400 is disposed between the second gravure roller 210 and the first gravure roller 120. The second gravure roller 210 can rotate relative to the second liquid storage tank 220 and is partly located in the second liquid storage tank 220. The surface of the substrate 10 is tangent to that of the second gravure roller 210, where the second gravure roller 210 includes the second roller body 211, the surface of the second roller body 211 is provided with the second engraving region 212, the second blank-leaving region 213, and the escape groove 214, width of the second engraving region 212 being equal to that of the second coating region 13 and a sum of the widths of the second blank-leaving region 213 and the second engraving region 212 being equal to the width of the blank region 12. The surface of the second engraving region 212 is provided with the plurality of second reticulate patterns 2121. The second blank-leaving region 213 has a smooth surface. The escape groove 214 runs through the circumferential side of the second roller body 211 to communicate with outside, width of the escape groove 214 being equal to that of the first coating region 11.

Technical features in the foregoing embodiments may be combined in any way. For brevity of description, possible combinations of the technical features in the foregoing embodiments are not described all. However, as long as there is no contradiction among combinations of these technical features, all the combinations should be considered within a range recorded in this specification.

The foregoing embodiments only represent several implementations of this application, and descriptions thereof are specific and detailed, but should not be construed as a limitation on the scope of this patent. It should be noted that those of ordinary skill in the art may further make several modifications and improvements without departing from the concept of this application, and these modifications and improvements also fall within the protection scope of this application. Therefore, the protection scope of this application should be subject to the appended claims.

What is claimed is:

1. A coating system for coating a substrate, wherein the coating system comprises:
   a first gravure apparatus configured to receive a substrate, wherein a surface of the substrate comprises at least one first coating region and at least one second coating region adjacent to the at least one first coating region, the first and second coating regions are not overlapped, wherein the first gravure apparatus comprises a first gravure roller, the first gravure roller comprises a first roller body, a surface of the first roller body comprises at least one first engraving region corresponding to the at least one first coating region, the at least one first engraving region and the at least one first coating region have an equal width, and the first gravure apparatus is configured to apply a first functional layer onto the at least one first coating region; and
   a second gravure apparatus arranged in a transporting direction of the substrate downstream from the first gravure apparatus and configured to receive the substrate having the first functional layer coated on the at least one first coating region, wherein the second gravure apparatus comprises a second gravure roller, the second gravure roller comprises a second roller body, a surface of the second roller body comprises at least one second engraving region corresponding to the at least one second coating region, the at least one second engraving region and the at least one second coating region have an equal width, wherein the second gravure apparatus is configured to apply a second functional layer made of a material different from that of the first functional layer onto the at least one second coating region.

2. The coating system according to claim 1, wherein the first gravure apparatus further comprises a first liquid storage tank loading the first functional layer, wherein the first gravure roller is rotatable relative to the first liquid storage tank and is partly located in the first liquid storage tank, and the surface of the substrate is tangent to that of the first gravure roller, wherein the first gravure roller is rotated to pick up and apply the first functional layer to the at least one first coating region.

3. The coating system according to claim 1, wherein the first engraving region has a plurality of first reticulate patterns.

4. The coating system according to claim 1, wherein the at least one second coating region is disposed at an edge of an outer periphery of the at least one first coating region along a width direction of the substrate, wherein the surface of the substrate further comprises at least one blank region located at a side of the at least one second coating region facing away from the at least one first coating region, the surface of the first roller body is provided with at least one first blank-leaving region adjacent to the at least one first engraving region and corresponding to the at least one blank region of the substrate, the at least one first blank-leaving region has a smooth surface, a width of the at least one first blank-leaving region is greater than a width of the corresponding blank region.

5. The coating system according to claim 4, wherein the surface of the first roller body comprises a plurality of first engraving regions, and the at least one first blank-leaving region is disposed between every two adjacent first engraving regions of the plurality of first engraving regions.

6. The coating system according to claim 4, wherein the first gravure apparatus further comprises a scraper, a blade of the scraper is tangent to surfaces of the at least one first engraving region and the at least one first blank-leaving region.

7. The coating system according to claim 1, wherein the second gravure apparatus further comprises a second liquid storage tank loading a source of the second functional layer, wherein the second gravure roller is rotatable relative to the second liquid storage tank and is partly located in the second liquid storage tank, and the surface of the substrate is tangent to that of the second gravure roller, wherein the second gravure roller is rotated to pick up and apply the source of the second functional layer.

8. The coating system according to claim 4, wherein the surface of the second roller body comprises at least one second blank-leaving region corresponding to the at least one blank region of the substrate, and a sum of the widths of the at least one second blank-leaving region and the at least one second engraving region is equal to the width of the at least one blank region; and
   a surface of the at least one second engraving region is provided with a plurality of second reticulate patterns, and the at least one second blank-leaving region has a smooth surface.

9. The coating system according to claim 1, wherein the second roller body further comprises at least one escape groove, wherein the at least one escape groove is recessed through a circumferential side of the second roller body to communicate with outside, a width of the at least one escape groove is equal to that of the at least one first coating region, and the surface of the second roller body is not in contact with the first coating region and the first functional layer coated thereon.

10. The coating system according to claim 9, wherein the at least one escape groove comprises a plurality of escape grooves along the width direction, the at least one second blank-leaving region is disposed between every two adjacent escape grooves, and edges of two ends of each one of the plurality of escape grooves are adjacent to the at least one second engraving region.

11. The coating system according to claim 1, wherein the coating system further comprises a first through roller, wherein the first through roller is disposed between the second gravure roller and the first gravure roller in the transporting direction.

12. The coating system according to claim 1, wherein the coating system further comprises a pressing roller and a winding roller for placing the substrate, the winding roller is located in the transporting direction of the substrate upstream from the first gravure roller and is higher than the first gravure roller in a vertical direction, and the pressing roller and the first gravure roller are disposed adjacent to each other and are configured to simultaneously rotate in different directions to transport the substrate.

13. The coating system according to claim 12, wherein the coating system further comprises a second through roller, wherein the second through roller is disposed between the winding roller and the pressing roller.

14. The coating system according to claim 1, wherein the first functional layer is a primer slurry, and the second functional layer is an insulation glue or insulation coating.

15. A coating system for coating a substrate, the coating system comprising:
a first gravure apparatus configured to receive a substrate, wherein a surface of the substrate comprises two first coating regions and four second coating regions, the four second coating regions comprises two outer second coating regions and two inner second coating regions, each one of the two first coating regions have two edges respectively adjacent to one of the outer second coating regions and one of the inner second coating regions, the first and second coating regions are not overlapped, wherein the first gravure apparatus comprises a first gravure roller, the first gravure roller comprises a first roller body, a surface of the first roller body comprises two first engraving regions respectively corresponding to the two first coating regions, each one of the first engraving regions and the corresponding first coating region have an equal width, and the first gravure apparatus is configured to apply a first functional layer onto the two first coating regions; and
a second gravure apparatus arranged in a transporting direction of the substrate downstream from the first gravure apparatus and configured to receive the substrate having the first functional layer coated on the two first coating regions, wherein the second gravure apparatus comprises a second gravure roller, the second gravure roller comprises a second roller body, a surface of the second roller body comprises four second engraving regions respectively corresponding to the four second coating regions, each one of the four second engraving regions and the corresponding second coating region have an equal width, wherein the second gravure apparatus is configured to apply a second functional layer made of a material different from a material of the first functional layer onto the four second coating regions.

16. The coating system according to claim 15, wherein the surface of the substrate further comprises a blank region located between the two inner second coating regions, the surface of the first roller body is provided with a first blank-leaving region between the two first engraving regions and corresponding to the blank region of the substrate, the first blank-leaving region has a smooth surface, a width of the first blank-leaving region is equal to a sum of a width of the blank region and a total width of the two inner second coating regions adjacent to the blank region.

17. The coating system according to claim 16, wherein the surface of the second roller body further comprises a second blank-leaving region corresponding to the blank region of the substrate, the second blank-leaving region is disposed between and adjacent to the two second engraving regions corresponding to the two inner second coating regions, and a sum of the widths of the second blank-leaving region and a total width of the two adjacent second engraving regions is equal to the width of the blank region; and
a surface of each one of the second engraving regions comprises a plurality of second reticulate patterns, and the second blank-leaving region has a smooth surface.

18. The coating system according to claim 15, wherein the second roller body further comprises two escape grooves respectively corresponding to the two first coating regions, each one of the two escape grooves is recessed through a circumferential side of the second roller body to communicate with outside, a width of each one of the two escape grooves is equal to the width of the first coating region, and the surface of the second roller body is not in contact with the first coating region and the first functional layer coated thereon.

* * * * *